(12) United States Patent
Reedy et al.

(10) Patent No.: US 6,382,208 B2
(45) Date of Patent: May 7, 2002

(54) SYSTEM FOR CONTROLLING THE INTERNAL TEMPERATURE OF A RESPIRATOR

(75) Inventors: Mark G. Reedy, Omaha, NE (US); Kevin L. Barton, Crescent, IA (US)

(73) Assignee: Board of Regents University of Nebraska, Lincoln, NE (US)

( * ) Notice: Subject to any disclaimer, the term of this patent is extended or adjusted under 35 U.S.C. 154(b) by 0 days.

(21) Appl. No.: 09/184,819

(22) Filed: Nov. 2, 1998

(51) Int. Cl.[7] .......................... A61M 16/00; A62B 7/00; F24J 3/00
(52) U.S. Cl. ............................ 128/204.17; 128/205.25; 128/206.21
(58) Field of Search ....................... 128/203.27, 204.17, 128/206.21, 206.22, 205.25, 204.15; 62/3.2; 2/171.3

(56) References Cited

U.S. PATENT DOCUMENTS

| | | | |
|---|---|---|---|
| 908,108 A | * 12/1908 | Knudsen | 128/206.21 |
| 2,784,714 A | * 3/1957 | Pitzipio | 128/204.17 |
| 3,629,868 A | * 12/1971 | Greenlee | 128/206.21 |
| 3,657,740 A | 4/1972 | Cialone | |
| 3,685,512 A | 8/1972 | Raschke | |
| 3,869,871 A | 3/1975 | Rybalko et al. | |
| 3,911,914 A | 10/1975 | Johansson | |
| 3,961,626 A | 6/1976 | Houchen et al. | |
| 4,011,865 A | * 3/1977 | Morishita | 128/206.21 |
| 4,024,730 A | 5/1977 | Bell et al. | |
| 4,090,513 A | 5/1978 | Togawa | |
| 4,105,027 A | 8/1978 | Lundquist | |
| 4,168,706 A | 9/1979 | Lovell | |
| 4,172,454 A | 10/1979 | Warncke et al. | |
| 4,211,086 A | 7/1980 | Leonard et al. | |
| 4,233,972 A | 11/1980 | Hauff et al. | |
| 4,237,877 A | 12/1980 | Boehler | |
| 4,309,774 A | 1/1982 | Guzowski | |
| 4,412,537 A | * 11/1983 | Tiger | 128/204.17 |
| 4,430,995 A | 2/1984 | Hilton | |
| 4,470,263 A | 9/1984 | Lehovec et al. | |
| 4,502,480 A | 3/1985 | Yamamoto | |
| 4,537,189 A | * 8/1985 | Vicenzi | 128/202.13 |
| 4,586,500 A | 5/1986 | Glynn | |
| 4,590,951 A | 5/1986 | O'Connor | |
| 4,649,912 A | 3/1987 | Collins | |

(List continued on next page.)

OTHER PUBLICATIONS

Brochure, "Respirators," 7 pages (undated).

*Primary Examiner*—John G. Weiss
*Assistant Examiner*—Joseph F. Weiss, Jr.
(74) *Attorney, Agent, or Firm*—Chook, Hardy & Bacon L.L.P.

(57) ABSTRACT

A system for controlling the temperature and relative humidity of the interior chamber of a respirator is disclosed. In the preferred embodiment, the system includes a body configured to conform to the face of a user and form an interior chamber defined by the respirator body and the face of the user. The system includes a sight region in the upper portion of the body through which the user can see. A thermoelectric module having a first temperature plate and a second temperature plate is interposed in the lower portion of the body so that the first temperature plate contacts the interior chamber and the second temperature plate contacts the external environment. A power source provides DC current to the thermoelectric module causing a temperature differential between the first temperature plate and the second temperature plate. Preferably, the plates of the thermoelectric module include heat exchangers and fans for maximizing the efficiency of the thermoelectric module. The power source includes means for reversing polarity to reverse the temperature differential of the thermoelectric module and means for modulating current to the thermoelectric module to control the temperature differential.

20 Claims, 2 Drawing Sheets

U.S. PATENT DOCUMENTS

| | | | |
|---|---|---|---|
| 4,730,612 A | | 3/1988 | Dampney |
| 4,841,963 A | * | 6/1989 | Vandeputte ............ 128/202.15 |
| 4,971,054 A | | 11/1990 | Andersson et al. |
| 5,054,479 A | * | 10/1991 | Yelland et al. ......... 128/201.25 |
| 5,054,480 A | * | 10/1991 | Bare et al. ............. 128/201.25 |
| 5,078,132 A | | 1/1992 | Braun et al. |
| 5,146,757 A | | 9/1992 | Dearing |
| 5,193,347 A | | 3/1993 | Apisdorf |
| 5,197,294 A | | 3/1993 | Galvan et al. |
| 5,372,130 A | | 12/1994 | Stern et al. |
| 5,404,874 A | * | 4/1995 | Meier .................... 128/206.17 |
| 5,413,097 A | * | 5/1995 | Birenheide et al. .... 128/206.17 |
| 5,435,299 A | | 7/1995 | Langman |
| 5,462,048 A | | 10/1995 | Lambert et al. |
| 5,511,541 A | * | 4/1996 | Dearstine ............... 128/201.13 |
| 5,533,500 A | * | 7/1996 | Her-Mou ............... 128/201.25 |
| 5,577,495 A | * | 11/1996 | Murphy ................ 128/201.24 |
| 5,623,828 A | | 4/1997 | Harrington |
| D383,592 S | | 9/1997 | Santilli |
| 5,662,161 A | * | 9/1997 | Hughes et al. ................ 165/10 |
| 5,666,949 A | | 9/1997 | Debe et al. |
| 5,697,361 A | | 12/1997 | Smith |
| 5,871,526 A | * | 2/1999 | Gibbs et al. ................ 607/104 |
| 5,878,742 A | * | 3/1999 | Figueredo et al. ..... 128/201.24 |
| 5,890,371 A | * | 4/1999 | Rajasubramanian et al. ........................ 62/259.2 |
| 6,014,971 A | * | 1/2000 | Danisch et al. ........ 128/201.25 |
| 6,050,262 A | * | 4/2000 | Jay ....................... 128/205.27 |

* cited by examiner

SYSTEM FOR CONTROLLING THE INTERNAL TEMPERATURE OF A RESPIRATOR

CROSS-REFERENCE TO RELATED APPLICATIONS

Not Applicable

STATEMENT REGARDING FEDERALLY-SPONSORED RESEARCH OR DEVELOPMENT

Not Applicable.

BACKGROUND OF THE INVENTION

The present invention relates to safety equipment for emergency personnel and, more particularly, to respirators.

Some of the most important vocations in our society involve controlling and remediating emergencies. These emergencies such as fires, hazardous substance spills and military operations, often require that individuals place themselves in close proximity to toxic liquids, dangerous airborne particulates and noxious gases. In addition, the environmental conditions at the sites of the emergencies are often inhospitable, if not extreme. The individuals who must encounter these toxic elements and harsh environmental conditions deserve the best protection achievable to permit them to carry out their vital duties with minimal risk to their safety.

Many of the dangers confronting emergency personnel are brought about by agents that affect the respiratory system. Smoke, toxic fumes, fomites and chemical/biological weapons usually attack the human body via the respiratory system. The primary mechanism to protect individuals against these agents is the gas mask or respirator, as it is known in the art. Respirators generally function to filter the air inhaled by the user to remove toxins. Efforts have been made to develop respirators to protect the integrity of the user's respiratory system while also allowing the user to dispatch their duties with minimal discomfort and inconvenience.

Respirators, by their nature, require that the user's face be substantially enclosed within an air-tight structure. This configuration protects the face, eyes, nose and mouth of the user from the external environment. Respirators typically include goggles or shields through which the user can see. Most importantly, though, respirators must have mechanisms that allow the user to breathe clean, toxin-free air. Such mechanisms may include an external clean air supply or a filter that removes harmful agents from the air as it is drawn into the interior chamber of the respirator.

The interior chamber defined by the user's face and the dimensions of the respirator is a confined area prone to elevated temperature and humidity. It is well-known that a individual's respiration accounts for a significant source of heat and moisture expiration from the body. Consequently, the user's physiological respiration into the small interior chamber of the respirator creates a significant accumulation of heat and moisture directly in front of the face of the user. This heightened temperature and moisture environment manifests itself in several disadvantageous ways.

First, the heightened temperature of the interior chamber is quite uncomfortable to the user. Moreover, the natural heat expellation by the user is dramatically increased during the strenuous activities involved in emergency situations. As the user works harder and as the stress of the emergency increases, the heat expelled into the interior chamber also increases. What is an uncomfortable situation at rest becomes an unbearable situation during activity.

Second, the increased moisture content of the air in the interior chamber causes a great deal of fogging on the interior of the goggles or face shield. The fogging on the interior of the shield makes it difficult for the user to see and, correspondingly, makes it increasingly difficult for the user to carry out their important emergency functions. As the relative humidity increases in the interior chamber, condensation forms inside the respirator and moisture accumulates within the air-sealed chamber. Not only does condensate accumulate within the respirator, but perspiration from the user's face caused from the extreme heat within the chamber also accumulates. As a result, a large volume of condensate and perspiration often settles in the lower regions of the respirator. The accumulated moisture occasionally finds its way to the air filtering mechanism of the respirator, which could greatly impede or defeat the air exchange needed by the user. If this occurs, the respirator becomes largely useless and the user is placed in serious peril.

Third, the combined effects of the elevated temperature and heightened humidity of the interior chamber of the respirator raises the overall body temperature of the user. Individuals who utilize respirators in emergency situations almost always wear external protective gear on their bodies. This external gear is necessarily waterproof and insulated against extreme temperatures. The external gear traps heat around the body and obstructs proper ventilation. It is well-known that the temperature of the head and face of a individual can greatly affect the overall temperature of the body. Thus, when the temperature of the face of the user increases during use of a conventional respirator, the overall temperature of the body of the user also increases and the external gear prevents adequate elimination of this heat. Elevated body temperatures can result in severe health consequences, including heat exhaustion and heat stroke. Untreated, these heat-related ailments can cause critical illness and, occasionally, death.

Conversely, while heat is the primary impediment to respirator use, some emergencies occur in cold environments, both natural and man-made. The above-detailed problems associated with elevated temperatures within the interior chamber of the respirator have corresponding drawbacks associated with depressed temperatures within the chamber. Cold air is more difficult to breathe and lowers the overall body temperature. Chilled air, as opposed to ambient or heated air, forms frost on the interior of the face shield or goggles, making it nearly impossible for the user to see. In these situations, the discomfort is no less severe to the user and the health implications are no less serious, including frostbite and hypothermia.

Therefore, there exists a compelling deficiency in the art for a system that would control the temperature and humidity within the interior chamber of a gas mask or respirator. The present invention addresses this deficiency and resolves it.

SUMMARY OF THE INVENTION

It is therefore an object of the present invention to provide a system that controls the temperature and humidity of the interior chamber of a respirator without compromising the safety of the user or impeding the user's ability to perform his or her duties.

More particularly, it is an object of the present invention to provide a system that incorporates a cooling/heating device directly in the respirator that serves to control the temperature of the interior chamber of a respirator.

It is a corresponding object of the present invention to provide a system incorporating a device directly in the respirator that reduces the humidity of the interior chamber of the respirator.

It is another object of the present invention to provide a system incorporating a device directly in the respirator that reduces interior fogging or frosting of the face shield or goggles of the respirator.

It is still another object of the present invention to provide a system that diverts and/or collects condensate and perspiration within a respirator.

It is yet another object of the present invention to develop a system for cooling and dehumidifying the interior chamber respirator which also assists in the cooling of the overall body of the user.

It is a corresponding object to the present invention to provide a system for raising the temperature of the interior chamber of a gas mask or respirator for use in environments involving cold conditions.

It is yet a further object of the present invention to provide a system for circulating air within the interior chamber of the respirator to aid in the cooling of the face of the user and to reduce fogging of the face shield or goggles of the respirator.

The above and other objects of the present invention will be obvious in view of the following disclosure and accompanying drawings.

To accomplish these and other related objects of the present invention, a system for controlling the temperature and humidity of the interior chamber of a respirator is disclosed. In the preferred embodiment, the system includes a body configured to conform to the face of a user, thereby forming an interior chamber defined by the respirator body and the face of the user. The system includes a sight region in the upper portion of the body through which the user can see. A thermoelectric module having a first temperature plate and a second temperature plate is mounted in the lower portion of the body so that the first temperature plate contacts the interior chamber and the second temperature plate contacts the external environment. A power source provides DC current to the thermoelectric module causing a temperature differential between the first temperature plate and the second temperature plate. Preferably, the plates of the thermoelectric modules include heat exchangers and fans for maximizing the efficiency of the thermoelectric module. The power source includes means for reversing polarity to reverse the temperature differential of the thermoelectric module and controlling the current thereto.

BRIEF DESCRIPTION OF THE DRAWINGS

The accompanying drawings form part of the specification and are to be read in conjunction with this disclosure.

DESCRIPTION OF THE PREFERRED EMBODIMENT

Figure 1:
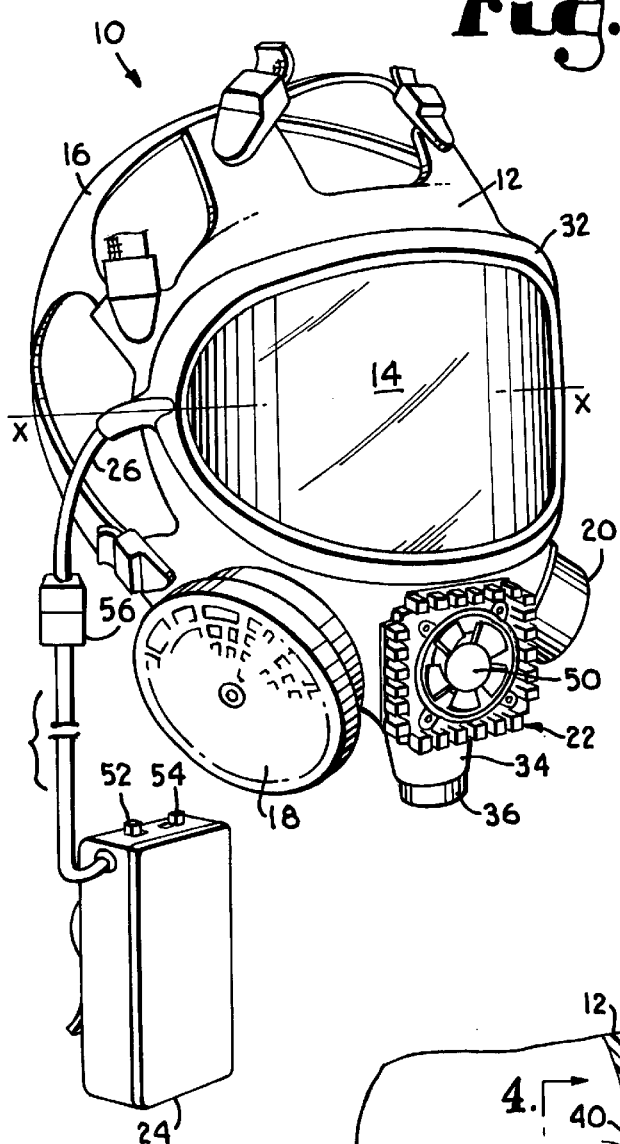
FIG. 1 is a perspective view of a respirator incorporating the system of the present invention wherein the power source is an external battery pack.
Figure 2:
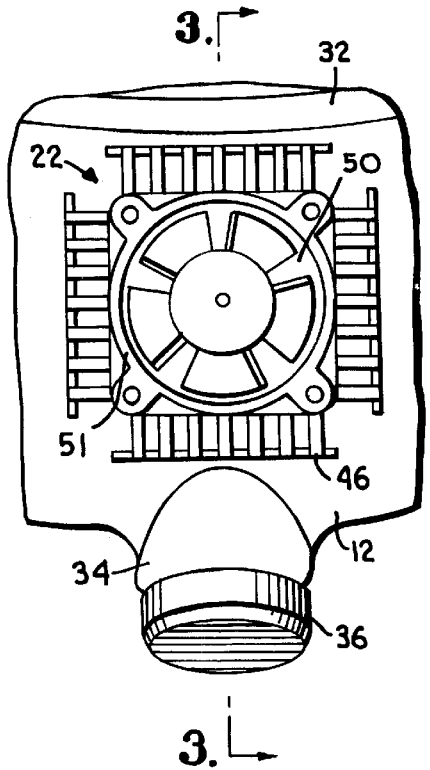
FIG. 2 is an enlarged fragmentary front view of the thermoelectric module of the present invention.

Turning now to the drawings, and initially to FIG. 1, a respirator equipped with the system of the present invention is broadly designated by the numeral 10. It is to be understood that the system of the invention is usable not only with conventional respirators, but with other masks and face shields designed to limit or restrict the flow of contaminants from the external environment to the user. For purposes of this disclosure, the term "respirator" will be used to designate any and all such apparatuses.

As can be seen by FIG. 1, a respirator equipped with the system of the present invention generally includes a body 12, a face shield 14, and a fastening harness 16. The lower portion of body 12 includes a filter 18, an exhaust valve 20 and a thermoelectric module 22. A power source 24 is connected to the thermoelectric module 22. A supplemental oxygen port 34 is positioned at the bottom of body 12 and is enclosed with a cap 36. Port 34 can be configured to receive an external source of oxygen or other gas where direct filtration of external air is not possible or not desirable. In the preferred embodiment, though, port 34 has been fitted with a cap 36.

Figure 3:
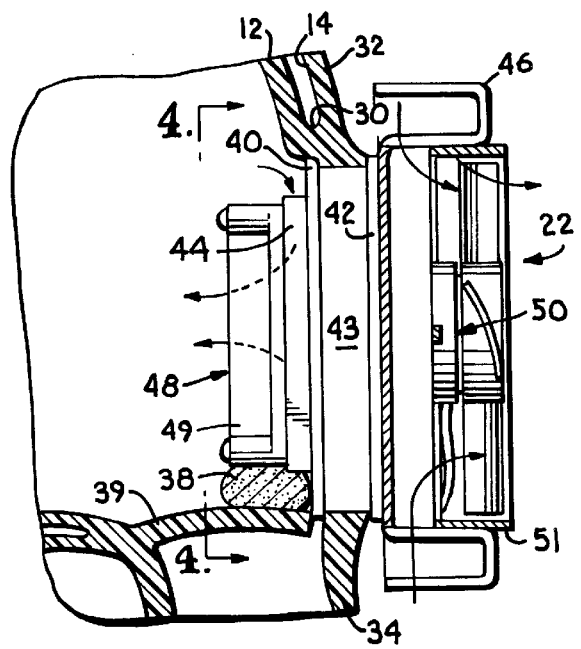
FIG. 3 is fragmentary sectional view of the thermoelectric module taken along line 3—3 of FIG. 2.

Focusing now in greater detail on the constituent elements of the system, the body 12 is generally ovular in shape wherein its vertical axis is greater than its horizontal axis. The ovular shape of body 12 allows the respirator 10 to conform to the face of the user. The body 12 also has a generally concave form along the vertical axis of the respirator 10. When positioned on the user, the configuration of respirator 10 forms an interior chamber 13, as best seen in FIG. 3, defined by the body 12, the face shield 14 and the face of the user. Preferably, the body 12 is sized to substantially enclose the eyes, nose and mouth of the user in an airtight engagement. Body 12 is preferably constructed of a durable, heat-resistant, deformable material, such as rubber. The precise material from which body 12 is formed, though, is not critical and other materials may be used without departing from the scope of the invention.

Fastening harness 16 is used to maintain the air-tight engagement of body 12 to the user's face. Harness 16 is adapted to engage the body 12 at a plurality of positions to promote a secure engagement. Harness 16 include a series of buckles 28 which are used to adjust the respirator 10 to conform to the individual shape characteristics of the head of the user and also to snugly secure the respirator 10 in place during use. It is important that the fastening harness 16 be sufficiently strong and resilient to maintain the respirator 10 in place even during vigorous activity. Preferably, the harness 16 is formed of a durable, heat-resistant rubber. It is also preferable that harness 16 be constructed of an elastic material to promote a snug engagement of the body 12 to the face of the user.

The face shield 14 of the respirator 10 is shown to be generally ovular in shape, wherein its horizontal axis is greater than its vertical axis. Shield 14 is preferably a concave piece of a transparent material conforming to the concave form of the body 12 and positioned in its upper portion to be generally aligned with the eyes of the user when the respirator 10 is in place. Face shield 14 is preferably formed as a single piece to permit substantially unobstructed viewing by the user when the respirator 10 is in use, but may be formed as separate lenses if desired. Shield 14 is constructed of a shock resistant transparent plastic or glass. Shield 14 may be tinted or include tinting means to reduce glare or ultraviolet radiation. It is understood that the construction of the face shield is not critical and other configurations of face shield 14 may also be used without departing from the scope of the invention.

Face shield 14 may be secured to body 12 by any suitable means, including gluing, integral forming or other fixing mechanisms. It is preferable, however, that face shield 14 be secured in a selectively releasable manner to the body 12 so that it may be replaced in the event it is cracked, scratched or otherwise damaged. To accomplish this, the face shield 14 is preferably sized to fit within a circumferential canal 30 formed in body 12 and secured in place by an annular flange 32.

Respirator 10 includes at least one filter 18 mounted in the bottom portion of body 12 laterally of the longitudinal axis of the respirator 10. Filter 18 is a commercially available filter adapted for use in connection with the particular respirator 10. There are many such filters available in the marketplace specifically designed for individual respirators. Depending on the desired application, filter 18 may filter gases, particulate matter, organic vapors or smoke. It is understood by those in the art that the particular filter to be used varies according to the particular application. The function of the filter 18 is to neutralize or remove particles, vapors, or other harmful agents from the exterior air as it is inhaled by the user inside the respirator 10. Thus, any material or composition capable of dispatching this neutralizing or filtering function may be used in connection with the system of the present invention without departing from its scope.

Exhaust valve 20 is also mounted in the lower portion of body 12 laterally of the longitudinal axis of the respirator 10, preferably opposite the filter 18. Exhaust 20 may be of any conventional design creating an airtight seal during inhale by the user, but allowing the exhaust of exhaled air outside of the respirator 10. Generally, exhaust valve 20 comprises a silicone flap which remains closed during negative pressure or ambient pressure in the interior chamber 13 and open during positive pressure, such as during exhalation. It is to be understood that any exhaust valve mechanism capable of achieving this function is within the scope of the present invention.

A wick 38 is positioned below and in contact with heatsink 44. Wick 38 allows for the physical collection of condensate and perspiration from within the interior chamber 13 of respirator 10. Wick 38 may be removed when saturated and replaced. Wick 38 can be held in place by any suitable means, such as adhesive, snaps, Velcro, or tab structures. The replacement procedure may be accomplished by removing the respirator 10 from the user to access the wick 38.

As an alternative to absorbent wick 38, inner wall section 39 of mask 10 may have a suitably dimensioned aperture formed therein (not shown). Cap 36 may be removed and replaced with a valve similar to silicone flap exhaust valve 20. This would permit the efflux of condensate or perspiration from interior chamber 13 via port 34 automatically upon exhalation, in addition to the normal air exhausting function of such a valve.

An example of a respirator equipped with many of the components of the preferred embodiment is the Willson™ Respirator Model 6000. This respirator may be obtained from a number of commercial sources, including The Industrial Safety Company, located at 1390 Newbrecht Road in Lima, Ohio. The Willson™ Model 6000 respirator is configured in modular form to accept a number of different filter cartridges, exhaust valves and drain tubes that are also commercially available from The Industrial Safety Company. The selection of appropriate components is within the common ability of one skilled in the art.

Thermoelectric module 22 is a conventional heat exchange unit utilizing the Peltier effect. The Peltier effect was first discovered in the early 19th century and occurs in plurimetallic alloys wherein the application of a voltage differential creates a displacement of free electrons from lower energy bands to upper energy bands in the form of heat from a high temperature electrode to a low temperature electrode. A conventional thermoelectric module includes an array of two dissimilar semiconductor materials, an N-type material and a P-type material, transversely mounted in parallel disposition between two insulator plates. Upon the application of current, one plate of the module will become cool and the other hot due to the displacement of electrons from one semiconductor to the other.

The thermoelectric module 22 of the present invention includes an interior insulator plate 40 and an exterior insulator plate 42 separated by an array of two dissimilar semiconductors, which are collectively represented in FIG. 3 by the numeral 43. The dissimilar semiconductors may be formed of any semiconductor material suitable for the requisite exchange of electrons. One semiconductor must be constructed of an N-type material, which has more electrons than necessary to complete a perfect molecular lattice structure. The other semiconductor must be a P-type material, which has an insufficient number of electrons to complete a lattice structure. Plates 40 and 42 may be constructed of any suitable insulating material, but are preferably constructed of ceramic.

Figure 4:
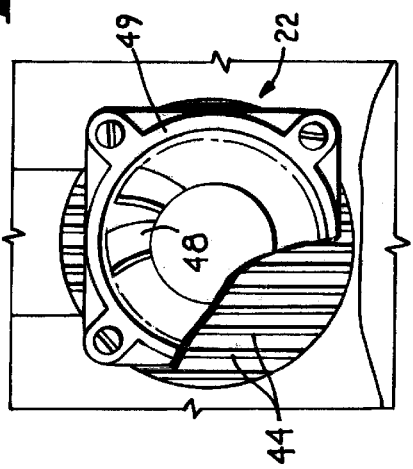
FIG. 4 is a fragmentary sectional view of the thermoelectric module of FIG. 2 taken along line 4—4 of FIG. 3, parts being broken away to reveal details of the construction.

As can be best seen in FIGS. 3 and 4, interior plate 40 is coupled to a metallic interior heat exchanger 44. Exchanger 44 may be coupled to plate 40 by any suitable means permitting thermal exchange. Heat exchanger 44 operates in a conventional manner to increase the surface area of plate 40 and thereby maximize the heat transfer from the plate 40 to the interior chamber 13. To maximize such heat transfer it is preferable that exchanger 44 present the greatest surface area possible. However, due to the space confines of the interior chamber 13, interior heat exchanger 44 preferably utilizes a plurality of parallel ribs, as seen in FIG. 4. The precise configuration of the interior heat exchanger 44 is largely a function of the design constraints existing with the respirator 10. It is understood that other configurations of heat exchanger 44 may also prove workable and are within the scope of the present invention.

An interior fan 48 is secured to the interior heat exchanger 44. Interior fan 48 includes a perimeter guard 49 and circulates air across the interior heat exchanger 44 to maximize the efficiency of the heat transfer from the interior plate 40 to the interior chamber 13. As seen in FIG. 3, fan 48 pulls air from the interior chamber 13 of the respirator 10 through the ribbed shape heat exchanger 44 and expels it circumferentially about interior chamber 13 of mask 10. This maximizes the cooling effect caused by the thermoelectric module 22 and also maximizes the dehumidifying function of the module 22 by drawing humid air directly onto the surface of heat exchanger 44. Interior fan 48 also circulates air inside the interior chamber 13 to further promote cooling of the face of the user and enhance the evaporation of moisture.

Exterior heat exchanger 46 is coupled to exterior plate 42 to increase the rate of heat exchange from plate 42 to the exterior environment. Exterior heat exchanger 46 operates in the same manner as interior heat exchanger 44. Plate 42 is bolted to exchanger 46 to permit thermal exchange, but any other suitable coupling means may also be used. In the preferred embodiment, exterior heat exchanger 46 includes a square metallic sheet coupled to plate 42 and projecting outwardly in four U-shaped grills. It is to be understood that the configuration of the exterior heat exchanger 46 may be altered to conform to the specific characteristics of the respirator 10. It is preferable that exchanger 44 present the greatest surface area possible without compromising the manageability and comfort of use of the respirator 10.

An exterior fan 50 is secured to the exterior heat exchanger 46. The exterior fan 50 also includes a perimeter guard 51 and provides a function similar to interior fan 48. Exterior fan 50 maximizes the flow of air across the exterior heat exchanger 46 to maximize the efficiency of the thermoelectric module 22.

There are numerous commercial sources for thermoelectric modules. In selecting the appropriate module, it is important to provide sufficient heating/cooling capacity to bring the interior chamber 13 of the respirator 10 to the desired temperature, which is generally room temperature. The calculation of cooling/heating power necessary for a given respirator is well within the common knowledge of one skilled in the art. Typically, respirators require about 50 Btu to maintain room temperature, which can be generated by a reasonably-sized thermoelectric module. A thermoelectric module conforming to the preferred embodiment of the invention and producing this level of power is the Peltier T.E.M. and heat sink module, Catalog No. 8688, sold by Marlin P. Jones & Associates in Lake Park, Fla. A commercially available fan for interior and exterior fans 48 and 50 is CPU Fan 12V, Catalog No. 7880 FN, which is also sold by Marlin P. Jones & Associates.

The thermoelectric module 22 of the present invention may be mounted in body 12 by any suitable means capable of securing module 22 to body 12 in a sealed relationship. Module 22 may be either permanently mounted in body 12 or selectively releasably mounted so that the module 22 can be replaced when needed. In the preferred embodiment, the module 22 is mounted through an orifice formed in the bottom portion of body 12. Module 22 is then bolted to secure this position. A sealant is applied at the juncture between module 22 and body 12 to ensure an airtight seal. It is to be understood that other means may be utilized to secure the thermoelectric module 22 to the body 12 without departing from the scope of the present invention.

The positioning of the thermoelectric module 22 is important to maximize the dehumidifying function of the system. Preferably, the thermoelectric module 22 is positioned in body 12 to be generally aligned with the mouth of the user when the respirator 10 is in place. This permits the thermoelectric module 22 to direct air at a controlled temperature directly to the interior chamber 13. In addition, body 12 should be configured to provide clearance between the interior fan 48 and the mouth of the user when the respirator 10 is in place. It is important that the thermoelectric module 22 not come into direct contact with the face of the user. The extreme temperature of the module 22 could harm the user if it were to come into direct contact. In addition, the circulating effect of the interior fan 48 requires that it be spaced from the user to promote maximum ventilation.

Power source 24 is shown in FIG. 1 as an external unit. Power source 24 includes a pair of conventional batteries. It is understood that one of ordinary skill in the art can readily calculate the power requirements of the system of the present invention for a particular use and, thus, select specified batteries to produce sufficient power to source 24 to meet such requirements. Preferably, source 24 includes a rechargeable power source, such as a pair of nickel cadmium batteries, supplying 14.4 volts of power. Power source 24 includes two switches and a potentiometer. The potentiometer is used to vary the temperature difference across plates 40 and 42, thus allowing variation of cooling or heating. Switch 52 is a simple on/off switch. When placed in the on position, power source 24 provides DC current to thermoelectric module 22 which both activates the module 22 and fans 48 and 50. In the off position, power source 24 terminates the flow of current to module 22 and fans 48 and 50. Switch 54 is a polarity switch. In normal operating conditions, the module 22 will cool interior plate 40 and warm exterior plate 42. By activating the polarity switch 54, the reverse takes effect, thereby heating the interior plate 40 and cooling the exterior plate 42. This function is important when utilizing the respirator 10 in cold environments.

Power source 24 is connected to the respirator 10 by lead line 26. A releasable jack 56 of conventional design allows for the power source 24 to be selectively disconnected from the respirator 10. Lead line 26 is connected to body 12 at a lateral edge of face shield 14. The lead line 26 continues under flange 32 to the bottom of shield 14, where it connects to module 22.

The components of the preferred power source 24 are readily commercially available. Integrated circuit LM 7805 can be purchased at Radio Shack, Part No. 276-1770. A 1 kohm 0.25W potentiometer, SPST switch (reverse polarity) and DPDT switch (power) are also available at Radio Shack. Batteries for source 24 are widely available from commercial outlets such as Radio Shack, Part No. 23-230. Other commercial outlets provide components equally suitable for carrying out the invention and may be used without departing from the scope of the invention.

Figure 5:
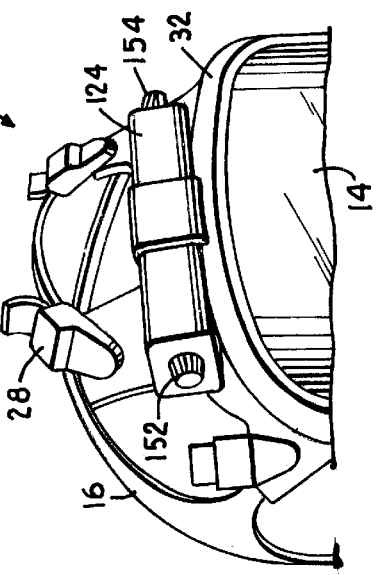
FIG. 5 is a fragmentary perspective view of the respirator shown in FIG. 1 illustrating an alternative embodiment wherein the power source is directly mounted to the body of the respirator above the face shield.

An alternative embodiment of power source 24 is shown in FIG. 5. In this embodiment, the power source 124 is mounted to the upper portion of the body 12 immediately above the face shield 14. Switches 152 and 154 and a potentiometer (which is preferably integral to power switch 152) are placed on opposite ends of the power source 124 and provide the same function as switches 52 and 54, respectively. In this embodiment, power source 124 is releasably secured to body 12 by clip 158 and could be located at any suitable location on the mask. Clip 158 permits source 124 to be easily exchanged with a fresh source when spent or replaced if source 124 becomes inoperable. The chief advantage of the alternative configuration of FIG. 5 is that the respirator is completely self-contained with no need for the user to carry an external power source 24. Power source 124 may be powered by lithium ion batteries which are readily commercially available. The power requirements of the batteries of the power source 124 depends upon the respirator 10 used and the conditions in which the respirator will be used. One skilled in the art can readily determine the power requirements of the respirator 10 in a particular application. Preferably, the batteries of source 124 are capable of providing 14.4 volts of DC current.

Figure 6:
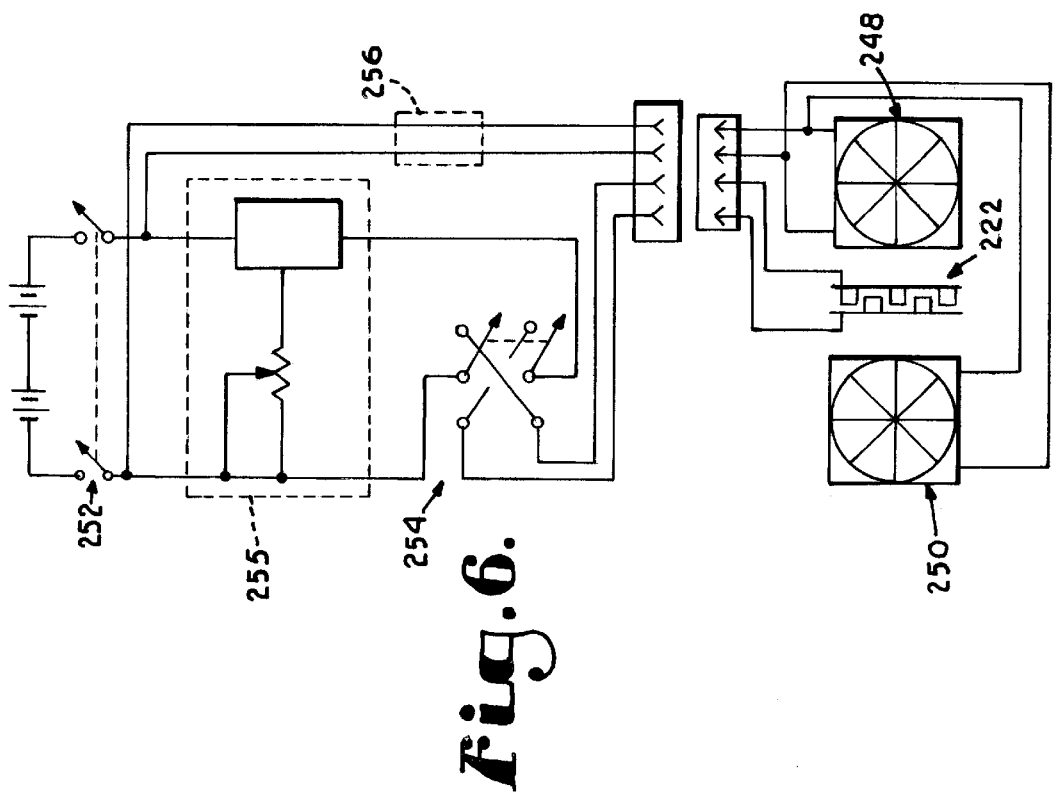
FIG. 6 is a schematic of the control circuit of the present invention which coordinates the operation of the thermoelectric module and the fans coupled to the module.

Turning now to FIG. 6, a schematic diagram showing the preferred embodiment of the power source control of the present invention is shown. The interior fan is designated by the numeral 248 and the external fan is designated 250. The thermoelectric module is designated by the numeral 222. The polarity reverse switch is 254 and the power switch is numeral 252. The area designated by the reference numeral 255 is the circuit diagram for the potentiometer. The area designated 256 could also be a potentiometer circuit similar to that shown in area 255 for adjusting fan speed. The schematic of FIG. 6 provides one of ordinary skill in the art with the necessary information to construct a control for the system of the present invention.

In operation, the respirator 10 is first positioned at the face of the user. The fastening harness 16 is placed over the head and adjusted with buckles 28 to secure the respirator 10 to the user. In proper position, the body 12 of the respirator 10 snugly abuts the user's face and surrounds the user's eyes, nose and mouth in an airtight engagement. It is important that an airtight seal be obtained at the perimeter of the body 12 against the face of the user. Face shield 14 should be generally aligned with the eyes of the user. Thermoelectric module 22 should be aligned with the mouth of the user.

The thermoelectric module is activated by the power switch 52. Once activated, the power source 24 provides DC current to the thermoelectric module 22, which begins to cool or heat interior chamber 13 as selected by the user. The power source 24 simultaneously activates both the interior fan 48 and the exterior fan 50. Fans 48 and 50 operate to increase the flow of air across heat exchangers 44 and 46, respectively, thereby maximizing the temperature differential of the module 22.

In cooling mode, the system of the present invention significantly reduces the temperature in the interior chamber 13 of the respirator 10. The thermoelectric module 22, as enhanced by the interior heat exchanger 44 and the interior fan 48, provides cool air to the interior chamber 13 which, in turn, cools the face of the user. The thermoelectric module 22 also dehumidifies the interior chamber 13 of the respirator 10. By reducing the moisture content of the air in the chamber 13, the system of present invention also reduces the fogging present on the interior surface of the face shield 14, thereby improving the ability of the user to see. Any condensation that would incur inside respirator 10 collects in the drain tube 34 and is absorbed by wick 38. The cooperative function of drain tube 34 and wick 38 enhances the dry environment of the chamber 13 and significantly improves the comfort of the user. Finally, the environment inside the chamber 13 serves to reduce the overall body temperature of the user. This reduces the likelihood of heat-related illnesses and allows the user to work longer and more effectively than when using conventional respirators.

In heating mode, the user would merely activate the polarity switch 54 which would reverse the function of the thermoelectric module 22, thereby heating the interior chamber 13 of the respirator 10. The module 22 would also serve to defrost the inner surface of face shield 14, which promotes better vision. By warming the face of the user, the system would aid in conserving body heat, thereby preventing frost bite and hypothermia.

There are many variations of the present invention. It shall be understood that the present invention is not limited by the specific embodiments discussed above, but encompasses all personalized cooling means using Peltier cells in connection with respirators of all kinds. It is apparent that this invention is well-adapted to obtain all the ends and objections set forth above along with other advantages that are obvious in view of this disclosure. It is to be understood that certain features and subcombinations are useful and may be employed without reference to the other features and subcombinations. This is contemplated by the disclosure and is within the scope of the claims.

Because many possible embodiments may be made of the present invention without departing from its scope, it is hereby understood that all matters set forth herein and shown in the accompanying drawings are to be interpreted as illustrative only, and not in the limiting sense.

The following is claimed:

1. A system for controlling the temperature within a respirator comprising:
    a body having a horizontal axis defining an upper and lower portion thereof, the body configured to generally conform to the face of a user and having a sight region configured to allow the user to see through the body, the body adapted to define an interior chamber at the face of the user for isolating a portion of the user's face from an exterior environment;
    a thermoelectric module located in the lower portion of the body, the module having a first temperature member and a second temperature member, the thermoelectric module being coupled with the body so that at least one surface of the first temperature member is located within the interior chamber and at least one surface of the second temperature member is located in the exterior environment; and
    a power unit for supplying power to the thermoelectric module.

2. The system of claim 1 further including an interior heat exchanger disposed adjacent the first member to increase heat exchange across the first member.

3. The system of claim 2 further comprising an interior air accelerator coupled to the thermoelectric module and disposed adjacent the interior heat exchanger.

4. The system of claim 3 further including an external heat exchanger disposed adjacent the second member to increase heat exchange across the second member.

5. The system of claim 4 further comprising an external air accelerator coupled with the thermoelectric module and disposed adjacent the external heat exchanger.

6. The system of claim 5 further comprising means for alternating the polarity of the thermoelectric module.

7. The system of claim 6 wherein the power unit is mounted to the body.

8. A temperature controlled respirator comprising:
    a body having a horizontal axis defining an upper and lower portion thereof, the body configured to conform to the face of a user in a substantially air-tight engagement, said body adapted to form an interior chamber defined by the body and a portion of the face of the user including the eyes, nose and mouth;
    means for securing the body to the face of the user;
    a transparent shield disposed on the body generally configured to be aligned with the eyes of the user when the respirator is in use;
    a thermoelectric module located in the lower portion of the body, the module disposed in the body configured to be generally aligned with the mouth of the user when the respirator is in use, the thermoelectric module having an interior plate with at least one surface located within the interior chamber and an external plate having at least one surface located in an outer environment; and
    a power unit imparting DC current to the thermoelectric module.

9. The respirator of claim 8 further comprising an interior heat exchanger coupled with the interior plate.

10. The respirator of claim 9 further comprising an interior fan disposed adjacent the interior plate and interior heat exchanger.

11. The respirator of claim 10 further comprising an external heat exchanger coupled with the external plate.

12. The respirator of claim 11 further comprising an external fan disposed adjacent the external plate and external heat exchanger.

13. The respirator of claim 12 further comprising means for diverting condensation formed during use of the respirator, the diverting means being disposed in a lower portion of the body.

14. The respirator of claim 13 further comprising means for absorbing condensation formed during use of the respirator, the absorbing means being disposed adjacent the diverting means.

15. A method for controlling the interior temperature of a respirator comprising:

provigin a respirator having a body having a horizontal axis defining an upper and lower portion thereof, the body configured to conform to the face of a user to form an interior chamber defined by the body and the face of the user;

providing a thermoelectric module located in the lower portion of the body, the module having a first temperature plate and a second temperature plate;

mounting the thermoelectric module to the respirator so that the first temperature plate has at least one surface located within the interior chamber and the second temperature plate has at least one surface located in an outer environment; and supplying DC power to the thermoelectric module to selectively change the temperature of the interior chamber.

16. The method of claim 15 further comprising reversing the polarity of the thermoelectric module to reverse the temperature change of the interior chamber.

17. The method of claim 16 further comprising collecting condensate formed during use of the respirator.

18. The method of claim 15 further comprising means for varying the temperature differential across the first and second temperature plates.

19. The method of claim 18 wherein said varying means includes a fan controlling means.

20. The method of claim 18 wherein said varying means includes a current controlling means.

* * * * *